(12) United States Patent
Arbab et al.

(10) Patent No.: US 7,659,221 B2
(45) Date of Patent: Feb. 9, 2010

(54) METAL NANOSTRUCTURED COLORANTS FOR HIGH REDOX GLASS

(75) Inventors: Mehran Arbab, Pittsburgh, PA (US); Larry Shelestak, Bairdford, PA (US); Songwei Lu, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 12/017,211

(22) Filed: Jan. 21, 2008

(65) Prior Publication Data

US 2008/0163649 A1   Jul. 10, 2008

Related U.S. Application Data

(62) Division of application No. 11/084,927, filed on Mar. 21, 2005, now abandoned.

(51) Int. Cl.
| | |
|---|---|
| C03C 3/087 | (2006.01) |
| C03C 3/078 | (2006.01) |
| C03C 8/18 | (2006.01) |
| C03C 17/00 | (2006.01) |
| C04B 14/00 | (2006.01) |
| C09C 1/62 | (2006.01) |
| C09C 1/34 | (2006.01) |

(52) U.S. Cl. .............. 501/70; 501/71; 501/72; 501/19; 65/60.1; 106/400; 106/403; 106/453; 106/456; 106/479; 106/480

(58) Field of Classification Search ............ 501/19, 501/70, 71, 72; 106/400, 456, 403, 480, 106/479, 453
See application file for complete search history.

(56) References Cited

U.S. PATENT DOCUMENTS

| | | | | | |
|---|---|---|---|---|---|
| 3,833,388 | A | * | 9/1974 | Ohlberg et al. | 428/34 |
| 2004/0229744 | A1 | * | 11/2004 | Heithoff | 501/72 |
| 2007/0037688 | A1 | * | 2/2007 | Smith et al. | 501/72 |
| 2007/0117708 | A1 | * | 5/2007 | Zguris et al. | 501/72 |

OTHER PUBLICATIONS

Stookey, 1949, "Coloration of Glass by Gold, Silver and Copper", Journal of American Ceramic Society vol. 32, No. 8, pp. 246-249.*
STIC search result, received Sep. 10, 2009.*

* cited by examiner

*Primary Examiner*—Jerry Lorengo
*Assistant Examiner*—Pegah Parvini
(74) *Attorney, Agent, or Firm*—Andrew C. Siniherio

(57) ABSTRACT

A colorant for a high redox glass composition comprising: total iron ($Fe_2O_3$) 0 to 1.1 weight percent; and from 0.0001 to 0.15 weight percent of at least one of the following: Cu nanostructures, Au nanostructures, or Ag nanostructures, wherein the weight percents are based on the total weight of the glass composition. The colorant of the invention can be used to make glass compositions having various colors.

7 Claims, No Drawings

METAL NANOSTRUCTURED COLORANTS FOR HIGH REDOX GLASS

CROSS-REFERENCE TO RELATED APPLICATION

This application is a divisional of U.S. application Ser. No. 11/084,927 filed Mar. 21, 2005, which is herein incorporated by reference in its entirety.

FIELD OF THE INVENTION

The present invention relates to colorants for glass compositions comprising metal nanostructures, glass compositions that contain the novel nanostructures of the invention and related methods. More particularly, the present invention relates to colorants for high redox glass compositions comprising nanostructures of copper, gold and/or silver.

BACKGROUND OF THE INVENTION

Glass substrates are used for various applications including automotive applications, architectural applications, aircraft applications, etc. Depending on the application, the glass substrate will need to exhibit certain performance properties such as visible light transmittance, infrared absorbance, etc. and aesthetic properties such as color, brightness, etc.

The performance properties of a glass substrate are primarily determined by the glass composition, i.e., the components used to make the glass. The glass composition is not the same as the batch materials (also referred to as the "starting materials") that are processed by a standard glass making technique, such as float glass processing, sheet drawing processing, crucible melts, etc., to make the glass composition. Generally, a glass composition is made up of a base glass portion and a colorant portion. A base glass portion comprising $SiO_2$, $Na_2O$, $CaO$, $MgO$, $Al_2O_3$, and $K_2O$ is well known in the art. Glass having the aforementioned base glass composition is referred to as "soda-lime-silica" glass. Other types of known glass compositions include non-silicated glasses and silicated glasses such as alkali borosilicate glass, alkali free borosilicate glass, phosphate glass, alumino borosilicate glass, etc.

Oftentimes, a glass composition will contain one or more colorants that interact to provide a glass composition having the desired color. For example, cobalt, which is well known in the art as a blue colorant, can be mixed with cadmium selenide, which is well known in the art as a red colorant to provide a glass composition having a gray color.

Some glass compositions having a low redox ratio (definitions for redox terms are included below) have included nanostructure sized colorants. Such glass compositions are typically made by melting the batch materials, forming and casting the molten glass into a sheet and then further heating the glass sheet to cause the nanostructures to form. Because the batch materials must be melted and then further heat treated, the process for forming these glass compositions is inefficient and expensive.

The present invention provides a novel metal nanostructured colorant for high redox glass compositions (includes glass compositions that fall outside of the definition for "low redox") such as, but not limited to, nanostructures of copper (Cu), gold (Au) and/or silver (Ag). Glass compositions according to the present invention are formed in a single heating step (i.e., the melting step).

SUMMARY OF THE INVENTION

In a non-limiting embodiment, the present invention is a colorant for a high redox glass composition comprising: total iron ($Fe_2O_3$) 0 to 1.1 weight percent; and from 0.0001 to 0.15 weight percent of at least one of the following: Cu nanostructures, Au nanostructures, or Ag nanostructures, wherein the weight percents are based on the total weight of the glass composition.

In another non-limiting embodiment, the present invention is a high redox glass composition having a colorant portion comprising: total iron ($Fe_2O_3$) 0 to 1.1 weight percent; and from 0.0001 to 0.15 weight percent of at least one of the following: Cu nanostructures, Au nanostructures, or Ag nanostructures, wherein the weight percents are based on the total weight of the glass composition.

In yet another non-limiting embodiment, the present invention is a method for forming a high redox glass composition comprising: melting a glass batch material wherein the resulting glass composition comprises: a base glass portion comprising: $SiO_2$ from 66 to 75 weight percent; $Na_2O$ from 10 to 20 weight percent; CaO from 5 to 15 weight percent; MgO from 0 to 5 weight percent; $Al_2O_3$ from 0 to 5 weight percent; $K_2O$ from 0 to 5 weight percent; BaO from 0 to 1 weight percent; $Bi_2O_3$ from 0 to 5 weight percent and a colorant portion comprising: total iron ($Fe_2O_3$) 0 to 1.1 weight percent; and from 0.0001 to 0.15 weight percent of at least one of the following: Cu nanostructures, Au nanostructures, or Ag nanostructures, wherein the weight percents are based on the total weight of the glass composition.

In a further non-limiting embodiment, the present invention is a method for forming a colored glass article in a single heating step, comprising the steps of:

providing a glass batch composition comprising a base glass portion comprising:

| | |
|---|---|
| $SiO_2$ | 66 to 75 weight percent |
| $Na_2O$ | 10 to 20 weight percent |
| CaO | 5 to 15 weight percent |
| MgO | 0 to 5 weight percent |
| $Al_2O_3$ | 0 to 5 weight percent |
| $K_2O$ | 0 to 5 weight percent |
| BaO | 0 to 1 weight percent |
| $Bi_2O_3$ | 0 to 5 weight percent |
| total iron ($Fe_2O_3$) | to provide a redox ratio of >0.35; | providing a colorant portion comprising precursor materials for at least one of Cu nanostructures, Au nanostructures, or Ag nanostructures;

heating the glass batch composition and colorant portion in a single heating step to form molten glass of a desired color having 0.0001 to 0.15 weight percent of at least one of Cu nanostructures, Au nanostructures, or Ag nanostructures;

depositing the molten glass on a bath of molten tin to form a glass ribbon of the desired color; and removing the glass ribbon from the molten tin bath to form glass sheets of the desired color.

DESCRIPTION OF THE INVENTION

As used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending With a maximum value of 10 or less, e.g., 1.0 to 3.8, 6.6 to 9.7 and 5.5 to 10.

As used herein, the term "purple" refers to a color having a DW ranging from 492 c nm to 570 c nm, for example, from 500 c nm to 560 c nm. "c" indicates the wavelength range is complimentary as is well known in the art.

As used herein, the term "yellow-green" refers to a color having a DW ranging from 550 nm to 576 nm, for example, from 558 nm to 572 nm.

As used herein, the term "red" refers to a color having a DW ranging from 596 nm to 780 nm, for example, from 620 nm to 760 nm.

As used herein, the term "gray" refers to a color having a $C^*$ (sq.rt. $(a^{*2}+b^{*2})$). <=4 at a visible transmittance of about 71% where $a^*$ and $b^*$ are determined using 1976 $L^*a^*b^*$ color space.

As used herein, the term "glass composition" refers to the compositional makeup of a glass substrate produced by a standard glass making process, for example, the float glass process. The glass composition is produced by processing "batch materials". The batch materials are the starting materials in a glass making process.

As used herein, the term "nanostructure" refers to a particle having a longest dimension up to 200 nm, for example, up to 100 nm, or up to 50 nm. The nanostructures can be any shape, including but not limited to, spherical, polyhedral-like cubic, triangular, pentagonal, rod-like, hexagonal, etc.

In a non-limiting embodiment, the present invention is a colorant for a high redox glass composition comprising nanostructures of Cu, Ag, and/or Au. Depending on the concentration of the various components that make up the colorant of the present invention, glass compositions having a myriad of colors can be produced. For example, a gray glass composition, a red glass composition, a purple glass composition, a yellow glass composition, and combinations thereof can be produced according to the present invention.

In the present invention, Cu nanostructures are used to provide a red color to a glass composition. Ag nanostructures are used to provide a yellow-green to color a glass composition. As is well known in the art, Ag nanostructures can also be used to impart antibacterial properties to the glass composition. Au nanostructures are used to provide a red to purple color to a glass composition depending on the concentration of Au nanostructures. In a non-limiting embodiment of the invention, Au nanostructures can be present in the glass composition in an amount ranging from 0.0001 to 0.05 weight percent, Similarly, Ag nanostructures can be present in the glass composition in an amount ranging from 0.0001 to 0.05 weight percent. Similarly, Cu nanostructures can be present in an amount ranging from 0.0001 to 0.15 weight percent.

Iron can be present in the glass composition as both ferric oxide ($Fe_2O_3$) and ferrous oxide (FeO). As is well known in the art, $Fe_2O_3$ is a strong ultraviolet radiation absorber and operates as a yellow colorant in the glass, and FeO is a strong infrared radiation absorber and operates as a blue colorant.

The "total iron" present in the glass composition of the invention is expressed as "$Fe_2O_3$". This is in accordance with standard practice.

The amount of iron present in the ferrous state in the glass composition of the present invention is expressed as "FeO". This is also in accordance with standard practice.

The above does not imply that all of the iron present in the glass composition is in the form of $Fe_2O_3$. Similarly, although the amount of iron in the ferrous state is expressed as FeO, the entire amount in the ferrous state may not actually be present in the glass as FeO.

According to the present invention, the total iron present in the glass composition can be up to 1.1 weight percent based on the total weight of the glass composition, for example, up to 0.4 weight percent, or up to 0.1 weight percent.

For iron-containing glasses, "redox ratio" is the amount of iron in the ferrous state (expressed as "FeO") divided by the amount of total iron (expressed as "$Fe_2O_3$"). According to the present invention, an iron-containing glass composition has a high redox if its redox ratio is equal to or greater than 0.35, for example, from 0.4 to 0.9, or from 0.5 to 0.8. For glass compositions that do not contain iron, they are classified as a high redox glass compositions if they have a partial pressure of oxygen less than $1 \times 10^{-2}$ atmospheres.

In a non-limiting embodiment of the invention, the colorant described above is added to a base glass portion as described in Table 1 below.

TABLE 1

Base Glass Portion of the Glass Composition of the Present Invention

| Compound | Weight % (based on the total weight of the glass composition) |
|---|---|
| $SiO_2$ | 66 to 75 |
| $Na_2O$ | 10 to 20 |
| CaO | 5 to 15 |
| MgO | 0 to 5 |
| $Al_2O_3$ | 0 to 5 |
| $K_2O$ | 0 to 5 |
| BaO | 0 to 1 |
| $Bi_2O_3$ | 0 to 5 |

It should be appreciated that the glass compositions disclosed herein may include small amounts of the materials identified above, for example as melting and refining aids, tramp materials or impurities. It should be further appreciated that some of these materials, as well as others, may be added to the glass to improve the solar performance of the glass, as will be discussed later in more detail.

In addition to the colorant of the present invention, additional colorants such as cobalt, nickel, neodymium oxide ($Nd_2O_3$), erbium, vanadium, selenium and chrome oxide ("$Cr_2O_3$") can be added to a glass composition according to the present invention. Cobalt is well known in the art as a blue colorant and can be included in glass compositions of the present invention in amounts up to 500 PPM. Nickel is well known in the art as a brown colorant and can be included in glass compositions of the present invention in amounts up to 1,000 PPM. $Nd_2O_3$ is well known in the art as a blue colorant and can be included in glass compositions of the present invention in amounts up to 3 weight percent based on the total weight of the glass composition. Erbium is well known in the art as a pink colorant and can be included in glass compositions of the present invention in amounts up to 2 weight percent based on the total weight of the glass composition. Chrome oxide is well known in the art as a green colorant and can be included in glass compositions of the present invention in amounts up to 1,000 PPM. Vanadium is well known in the art as a green colorant and can be included in glass compositions of the present invention in amounts up to 0.3 weight percent based on the total weight of the glass composition. Selenium is well known in the art as a red colorant and can be present in an amount up to 50 PPM. These additional colorants can interact with the colorant of the present invention and enable even more colors of glass compositions according to the present invention to be formed.

In a non-limiting embodiment of the invention, a colorant portion comprising Cu and/or Au nanostructures and cobalt are used to form a gray glass composition.

In a non-limiting embodiment of the invention, the glass compositions are formed from batch materials comprising (a) starting materials for the base glass portion as are well known in the art, and (b) precursors for the colorants of the present invention that will be included in the glass composition.

The precursors for the various nanostructures are as follows. For Au nanostructures, gold-containing materials are suitable precursors. Non-limiting examples of suitable gold-containing materials are hydrogen tetrachloreaurate (III) trihydrate ($HAuCl_4 \cdot 3H_2O$), gold (III) chloride, gold (III) oxide, sodium aurothiomalate hydrate, and gold (III) hydroxide, as well as mixtures and combinations thereof.

For Ag nanostructures, silver-containing materials are suitable precursors. Non-limiting examples of suitable silver-containing materials are silver nitrate ($AgNO_3$), silver chloride, silver oxide, silver acetate, silver perchlorate, and silver acetylacetonate, as well as mixtures and combinations thereof.

For Cu nanostructures, copper-containing materials are suitable precursors. Non-limiting examples of suitable copper-containing materials include copper-containing sulfates, copper-containing nitrates and copper-containing oxides such cuprous oxide ($Cu_2O$) and cupric oxide (CuO), as well as mixtures and combinations thereof.

Reducing agents are added to the batch materials to reduce the metal-containing materials which serve as precursors to the metal nanostructures to their various elemental states. For example, a gold-containing material such as $HAuCl_4 3 \cdot H_2O$ is reduced to Au in its elemental state. The reducing agents also reduce any iron present in the batch material as well.

Suitable reducing agents include, but are not limited to, stannous oxide (SnO), selenium (Se), tellurium dioxide ($TeO_2$), bismuth oxide ($Bi_2O_3$), or any carbon-containing materials, such as anthracite powdered coal, as well as mixtures of the previously mentioned materials. If the batch material includes a reducing agent that has a carbon-containing material, most, if not all, of the carbon present in the batch material will burn off during the glass processing steps, especially during the melting step. As a result, a minimal amount of carbon is typically present in the glass composition.

According to the present invention, the amount of reducing agent present in the batch material can be adjusted as is well known in the art to obtain the desired redox ratio. The amount of reducing agent required will depend, in part, on the quantity of multivalent colorants present in the batch material.

According to the present invention, the appropriate batch materials are subjected to a single heating step (i.e., melting) to form a glass composition having the desired nanostructures. The nanostructures are formed during the melting step as a result of the high (0.35 or greater) redox ratio of the glass composition. Specifically, the solubility of the metal-containing precursor material in the glass composition is directly related the redox ratio. The higher the redox ratio of the glass composition, the less soluble the metal-containing precursor colorant material is in the glass composition resulting in a higher concentration of metal nanostructures in the glass composition.

In order to ensure the formation of the desired nanostructures during the melting stage, certain materials that might prevent the metal-containing precursor materials from being reduced because they are more easily reduced (have a Gibbs Free Energy ($\Delta G$) less than or equal to $=-75$ kcal/mol) than the metal-containing precursor material should be avoided or minimized in the batch materials. An example of such a material is manganese oxide.

The glass composition of the present invention can include small amounts of other materials that have not been described in detail. For example, the glass composition of the present invention can include melting and refining aids, tramp materials and various impurities. Also, the glass composition of the present invention can include materials that can improve the solar performance of the glass composition. For example, titanium oxide ($TiO_2$) can be added to the glass composition to improve its UV performance.

The glass composition of the present invention can be formed via all of the well known glass making processes. For example, the glass composition can be formed from batch materials via crucible melts, a sheet drawing process, a float glass process, etc. In a non-limiting embodiment, the glass composition of the present invention is formed via a float glass process comprising the following steps. First, the necessary batch materials are melted in a furnace or other similar device as is well known in the art. Several types of melting arrangements can be utilized, such as but not limited to, a conventional, overhead fired continuous melting operation and a multi-stage melting operation. After melting, the molten glass is deposited onto a bath of molten tin and formed into a glass ribbon. The glass ribbon is subsequently removed from the tin bath, annealed and cut into glass sheets.

When the glass composition is formed via a float glass process, the glass composition can contain measurable amounts of tin oxide ($SnO_2$). This is because tin from the molten bath can migrate into the lower surface portions of the glass ribbon in contact with the tin. Generally, a glass composition formed via a float process will have a $SnO_2$ concentration of at least 0.05 wt. % in the first few microns below the surface of the glass that was in contact with the tin.

According to the present invention, glass substrates having various thicknesses can be formed. For example, glass substrates up to 24 mm can be formed.

EXAMPLES

The present invention is described using the following non-limiting samples (Samples 1-11). The samples were made using the batch materials as shown in Table 2.

TABLE 2

Batch Materials for the Glass Compositions of the Invention

| Component | Sample 1 | Sample 2 | Sample 3 | Sample 4 | Sample 5 |
|---|---|---|---|---|---|
| Sand [g] | 334.72 | 334.72 | 334.72 | 334.72 | 336.67 |
| Soda ash [g] | 109.45 | 109.45 | 109.45 | 109.45 | 124.29 |

TABLE 2-continued

Batch Materials for the Glass Compositions of the Invention

| | | | | | |
|---|---|---|---|---|---|
| Limestone [g] | 28.45 | 28.45 | 28.45 | 28.45 | 0 |
| Aragonite [g] | 0 | 0 | 0 | 0 | 95.70 |
| Aluminum Hydrate [g] | 0 | 0 | 0 | 0 | 11.55 |
| Dolomite [g] | 80.67 | 80.67 | 80.67 | 80.67 | 0 |
| Salt cake [g] | 2.34 | 2.34 | 2.34 | 2.34 | 2.57 |
| Rouge [g] | 1.24 | 1.24 | 1.24 | 1.24 | 0 |
| Coal [g] | 0.89 | 0.89 | 0.89 | 0.89 | 0.50 |
| Se [g] | 0 | 0.63 | 0.063 | 0.063 | 0 |
| SnO [g] | 0 | 1.4 | 0 | 0 | 0 |
| $SnO_2$ [g] | 0 | 0 | 0 | 0 | 0 |
| 12.7 weight percent aqueous solution of $HAuCl_4 \cdot 3H_2O$ [g] | 0.566 | 0.566 | 0.566 | 1.13 | 0.81 |
| Ag $NO_3$ [g] | 0.06 | 0.06 | 0 | 0 | 0 |
| $Cu_2O$ [wt %] | 0 | 0 | 0 | 0 | 0 |
| $TeO_2$ [wt %] | 0 | 0 | 0 | 0 | 0 |
| $Bi_2O_3$ [wt %] | 0 | 0 | 0 | 0 | 0 |

| Component | Sample 6 | Sample 7 | Sample 8 | Sample 9 | Sample 10 | Sample 11 |
|---|---|---|---|---|---|---|
| Sand [g] | 500 | 500 | 500 | 500 | 500 | 500 |
| Soda ash [g] | 165 | 165 | 165 | 165 | 165 | 165 |
| Limestone [g] | 69 | 69 | 69 | 69 | 69 | 69 |
| Aragonite [g] | 0 | 0 | 0 | 0 | 0 | 0 |
| Aluminum Hydrate [g] | 0 | 0 | 0 | 0 | 0 | 0 |
| Dolomite [g] | 94.5 | 94.5 | 94.5 | 94.5 | 94.5 | 94.5 |
| Salt cake [g] | 0 | 0 | 0 | 0 | 0 | 0 |
| Rouge [g] | 0 | 0 | 0 | 0 | 0 | 0 |
| Coal [g] | 1 | 1 | 1 | 1 | 1 | 1 |
| Se [g] | 0 | 0 | 0.112 | 0.22 | 0 | 0 |
| SnO [g] | 0 | 0 | 0 | 0 | 0 | 0 |
| $SnO_2$ [g] | 1.6 | 1.6 | 1.6 | 1.6 | 1.6 | 1.6 |
| 12.7 weight percent aqueous solution of $HAuCl_4 \cdot 3H_2O$ [g] | 0 | 0 | 0 | 0 | 0 | 0 |
| Ag $NO_3$ [g] | 0 | 0 | 0 | 0 | 0 | 0 |
| $Cu_2O$ [wt %] | 0.6 | 0.6 | 0.6 | 0.6 | 0.6 | 0.6 |
| $TeO_2$ [wt %] | 0.14 | 0.28 | 0 | 0 | 0 | 0 |
| $Bi_2O_3$ [wt %] | 0 | 0 | 0 | 0 | 0.112 | 0.224 |

The samples were chemically analyzed using a RIGAKU 3370 X-ray fluorescence spectrophotometer to determine the glass compositions. The glass compositions are shown in Table 3. The amount of FeO in the exemplary compositions was determined from the spectral absorbance at 1000 nm as is well known in the art.

TABLE 3

Glass Compositions according to the Present Invention

| Components | Sample 1 | Sample 2 | Sample 3 | Sample 4 | Sample 5 |
|---|---|---|---|---|---|
| Base Glass Portion | | | | | |
| $SiO_2$ [wt. %] | 73.13 | 73.05 | 72.85 | 72.66 | 73.09 |
| $Na_2O$ [wt. %] | 13.76 | 13.70 | 13.85 | 13.95 | 14.76 |
| $K_2O$ [wt. %] | 0.040 | 0.041 | 0.046 | 0.045 | 0.013 |
| CaO [wt. %] | 8.88 | 8.84 | 8.95 | 9.02 | 10.02 |
| MgO [wt. %] | 3.56 | 3.54 | 3.65 | 3.66 | 0.08 |
| $Al_2O_3$ [wt. %] | 0.12 | 0.12 | 0.14 | 0.14 | 1.79 |
| $SO_3$ [wt. %] | 0.088 | 0.096 | 0.093 | 0.084 | 0.003 |
| Colorant Portion | | | | | |
| Total Iron [wt. %] | 0.359 | 0.355 | 0.363 | 0.364 | 0.009 |
| Redox ratio | 0.48 | 0.62 | 0.54 | 0.54 | 0.50 |
| Au nanostructures | 0.005 | 0.005 | 0.005 | 0.01 | <0.01 |
| Ag nanostructures | 0.005 | 0.0005 | 0 | 0 | 0 |

*the weight percents are based on the total weight of the glass composition.
**other materials like SrO, Cl, BaO, $TiO_2$, $ZrO_2$ and $SnO_2$ were determined to be present in the exemplary glass compositions in small amounts.

| Components | Sample 6 | Sample 7 | Sample 8 | Sample 9 | Sample 10 | Sample 11 |
|---|---|---|---|---|---|---|
| Base Glass Portion | | | | | | |
| $SiO_2$ [wt. %] | 73.57 | 73.51 | 73.79 | 73.66 | 73.6 | 73.48 |
| $Na_2O$ [wt. %] | 13.54 | 13.49 | 13.54 | 13.43 | 13.56 | 13.55 |
| $K_2O$ [wt. %] | 0.036 | 0.035 | 0.038 | 0.038 | 0.037 | 0.038 |
| CaO [wt. %] | 9.39 | 9.46 | 9.23 | 9.39 | 9.35 | 9.45 |
| MgO [wt. %] | 2.92 | 2.97 | 2.85 | 2.93 | 2.9 | 2.93 |
| $Al_2O_3$ [wt. %] | 0.12 | 0.12 | 0.13 | 0.13 | 0.12 | 0.13 |
| $SO_3$ [wt. %] | 0.008 | 0.008 | 0.007 | 0.007 | 0.008 | 0.009 |
| Colorant Portion | | | | | | |
| Total Iron | 0.037 | 0.036 | 0.037 | 0.037 | 0.037 | 0.038 |
| Redox ratio | 0.62 | 0.90 | 0.54 | 0.75 | 0.90 | 0.44 |
| Se [wt. %] | <0.0003 | <0.0003 | 0.0031 | 0.0043 | <0.0003 | <0.0003 |
| Cu [%]* | 0.077 | 0.076 | 0.077 | 0.078 | 0.078 | 0.078 |

*the weight percent of Cu was calculated from the XRF results based on the measurement of CuO which is assumed to be responsible for any copper peak.

Various terms are used to characterize the performance properties of glass substrates according to the present invention. A description of the terms appears below.

The redox ratios were estimated in conventional manner from the spectral data of the glass. For example, the spectral FeO was defined as equal to $\log(R_f/(T_{1000})/\alpha \times d$, where $R_f$ equals the reflection factor (defined as 100 minus the percent surface reflectance), $T_{1000}$ equals the transmittance at 1000 nm, $\alpha$ equals the luminous absorption coefficient (which for FeO at 1000 nm is 21.5), and d equals the thickness of the glass in inches. The total iron (as $Fe_2O_3$) was determined by x-ray fluorescence. The redox ratio was then calculated as the spectral FeO divided by the total iron (as $Fe_2O_3$).

Luminous transmittance (LTA) was measured using C.I.E. 1931 standard illuminant "A" over the wavelength range 380 to 780 nm at 10 nanometer intervals in accordance with ASTM 308E-90.

ISOUV was measured over the wavelength range from 300 nm to 400 nm at 5 nm intervals computed using Parry Moon air mass 2.0 solar data based on measured transmittances.

The dominant wavelength ("DW") was measured using C.I.E. 1931 standard illuminant "C" with a 2° observer.

Total solar infrared reflectance (TSIR) is the amount of infrared energy reflected from a surface and was measured over the wavelength range from 800 nm to 2100 nm at 50 nm intervals.

Total solar energy transmittance (TSET) is the total amount of solar energy transmitted through a substrate and was computed using Parry Moon air mass 2.0 solar data based on measured transmittances from 300 nm to 2100 nm at 50 nm intervals.

TSIR and TSET were computed using Parry Moon air mass 2.0 solar data based on measured transmittances.

Excitation purity (Pe) refers to one variable in a method for specifying color adopted by the International Commission on Illumination (CIE). It was measured using C.I.E. 1931 standard illuminant "C" with a 2° observer.

The performance properties of a 0.160 inch thick piece of glass were calculated using a Perkin-Elmer Lambda 9 UV/VIS/NIR spectrophotometer. The samples were analyzed prior to tempering the glass and were not exposed to ultraviolet radiation. The performance properties of glass substrates according to the present invention are shown in Table 4 below.

TABLE 4

Performance Data for the Exemplary Glass Compositions

| Performance Property | Sample 1 | Sample 2 | Sample 3 | Sample 4 | Sample 5 |
|---|---|---|---|---|---|
| LTA [%] | 72.44 | 73.41 | 41.30 | 29.29 | 59.51 |
| TSIR [%] | 30.97 | 23.19 | 26.39 | 26.83 | 85.94 |
| TSET [%] | 44.26 | 42.80 | 34.88 | 30.99 | 74.5 |
| ISOUV [%] | 20.67 | 28.82 | 17.53 | 12.09 | 41.98 |
| DW (nm) | 568.00 | 563.67 | 620.70 | 494.04c | 597.34 |
| Pe [%] | 50.82 | 25.16 | 7.29 | 17.05 | 16.22 |

| Performance Property | Sample 6 | Sample 7 | Sample 8 | Sample 9 | Sample 10 | Sample 11 |
|---|---|---|---|---|---|---|
| LTA [%] | 4.69 | 1.60 | 10.19 | 1.55 | 0.47 | 23.58 |
| TSIR [%] | 69.04 | 64.87 | 70.28 | 66.59 | 55.74 | 71.95 |
| TSET [%] | 40.62 | 34.65 | 44.42 | 36.11 | 27.19 | 50.38 |
| ISOUV [%] | 0.01 | 0.01 | 0.06 | 0.01 | 0.01 | 0.09 |
| DW (nm) | 630.11 | 639.43 | 619.15 | 643.30 | 643.26 | 602.21 |
| Pe [%] | 99.94 | 99.46 | 99.91 | 99.80 | 99.93 | 87.09 |

Based on Table 4, it can be seen that colored glass compositions can be formed that include metal nanostructured colorants according to the present invention without reheating the glass after melting. For example and without limiting the present invention, the glass compositions of the present invention can be used to form glass substrates that exhibit the various performance properties. The non-limiting examples show a high redox glass composition using gold and silver nanostructures as colorant having a yellow-green color can be formed having an LTA ranging from 65% to 75%, for example from 68% to 70% and an ISOUV ranging from 15% to 35%, for example from 20% to 30% at a thickness of 0.16 inches. See Samples 1 and 2. The non-limiting examples also show a high redox glass composition using gold nanostructures as colorant having a red color can be formed having an LTA ranging from 35% to 45%, for example from 37% to 42% and an ISOUV ranging from 10% to 30%, for example from 15% to 25% at a thickness of 0.16 inches. See Sample 3. Further, the non-limiting examples also show a glass composition having a purple color can be formed having an LTA ranging from 20% to 40%, for example from 25% to 35% and an ISOUV ranging from 5% to 15%, for example from 7% to 12%. See Sample 4. Further, the non-limiting examples also show a glass composition having a red color can be formed having an LTA ranging from 50% to 70%, for example from 55% to 65% and an ISOUV ranging from 30% to 50%, for example from 35% to 45%. See Sample 5. The non-limiting examples also show a high redox glass composition using copper nanostructures as the colorant having a red color can be formed having an LTA ranging from 0.4% to 24%, for example from 0.5% to 22% and an ISOUV ranging from 0.01% to 0.5%, for example from 0.02% to 0.3% at a thickness of 0.16 inches. See Samples 6-11.

It will be readily appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

We claim:

1. A method for forming a colored glass article in a single heating step, comprising the steps of:

providing a glass batch composition comprising a base glass portion comprising:

| $SiO_2$ | 66 to 75 weight percent |
|---|---|
| $Na_2O$ | 10 to 20 weight percent |
| CaO | 5 to 15 weight percent |
| MgO | 0 to 5 weight percent |
| $Al_2O_3$ | 0 to 5 weight percent |
| $K_2O$ | 0 to 5 weight percent |
| BaO | 0 to 1 weight percent |
| $Bi_2O_3$ | 0 to 5 weight percent |
| total iron ($Fe_2O_3$) | to provide a redox ratio of >0.35; | providing a colorant portion comprising precursor materials for at least one of Cu nanostructures, Au nanostructures, or Ag nanostructures, wherein the Cu nanostructures precursor is selected from the group consisting of copper containing sulfates, copper containing nitrates, and copper containing oxides; the Au nanostructures precursor is selected from the group consisting of hydrogen tetrachloreaurate (III) tri-hydrate ($HAuCl_4.3H_2O$), gold (III) chloride, gold (III) oxide, sodium aurothiomalate hydrate, and gold (III) hydroxide; and the Ag nanostructures precursor is selected from the group consisting of silver nitrate ($AgNO_3$), silver chloride, silver oxide, silver acetate, silver perchlorate, and silver acetylacetonate;

heating the glass batch composition and colorant portion in a single heating step to form molten glass of a desired color having at least one of 0.0001 to 0.15 weight percent of Cu nanostructures, <0.01 weight percent of Au nanostructures, or <0.01 weight percent of Ag nanostructures;

depositing the molten glass on a bath of molten tin to form a glass ribbon of the desired color; and removing the glass ribbon from the molten tin bath to form glass sheets of the desired color.

2. The method according to claim 1, wherein the amount of total iron ranges from 0.005 to 0.40 weight percent.

3. The method according to claim 1, further comprising adding at least one of the following to the batch material: cobalt, nickel, neodymium oxide, erbium, vanadium and chrome oxide.

4. The method according to claim 3, further comprising adding cobalt in an amount ranging up to 500 PPM.

5. The method according to claim 1, further comprising adding selenium in an amount up to 50 PPM.

6. The method according to claim 1, further comprising adding at least one reducing agent selected from stannous oxide (SnO), selenium (Se), tellurium dioxide ($TeO_2$), bismuth oxide ($Bi_2O_3$), or anthracite powdered coal.

7. A glass article made from the method of claim 1.

* * * * *